Feb. 23, 1965   R. A. BUTLER ETAL   3,171,114
AUTOMATIC PROGRAMMER
Filed Jan. 3, 1961   6 Sheets-Sheet 1
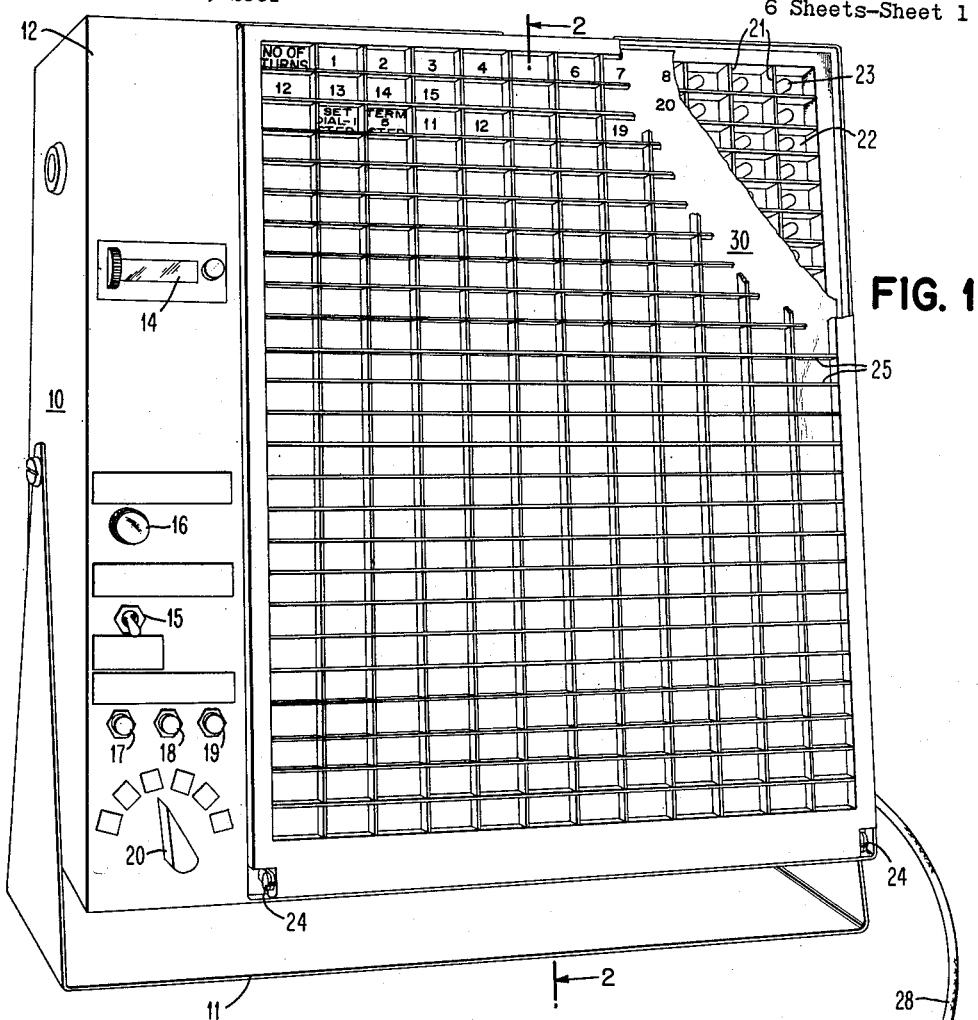
FIG. 1
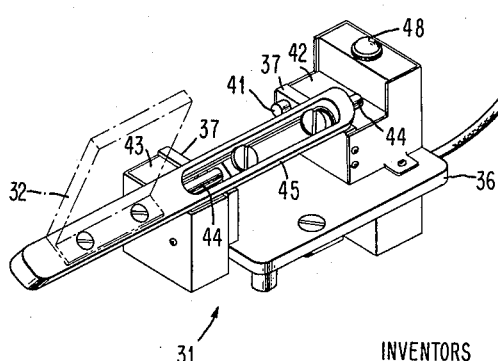
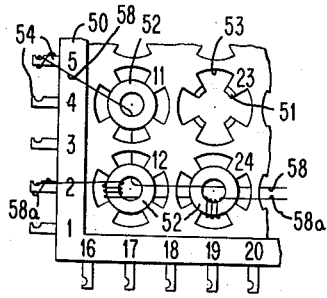
FIG. 8
INVENTORS
RICHARD A. BUTLER
ROBERT H. CADWALLADER
JOSEPH J. ISOLE Jr.
GERR PARK
BY *John L. Sterling*
ATTORNEY Feb. 23, 1965     R. A. BUTLER ETAL     3,171,114
AUTOMATIC PROGRAMMER Filed Jan. 3, 1961     6 Sheets-Sheet 2

Feb. 23, 1965   R. A. BUTLER ETAL   3,171,114
AUTOMATIC PROGRAMMER
Filed Jan. 3, 1961   6 Sheets-Sheet 3
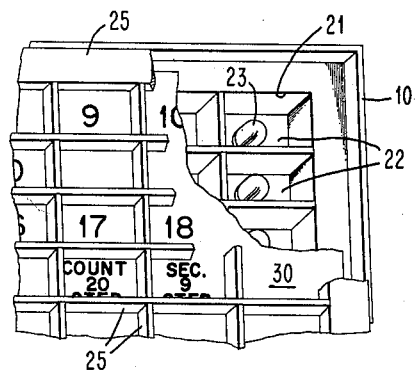
FIG. 3
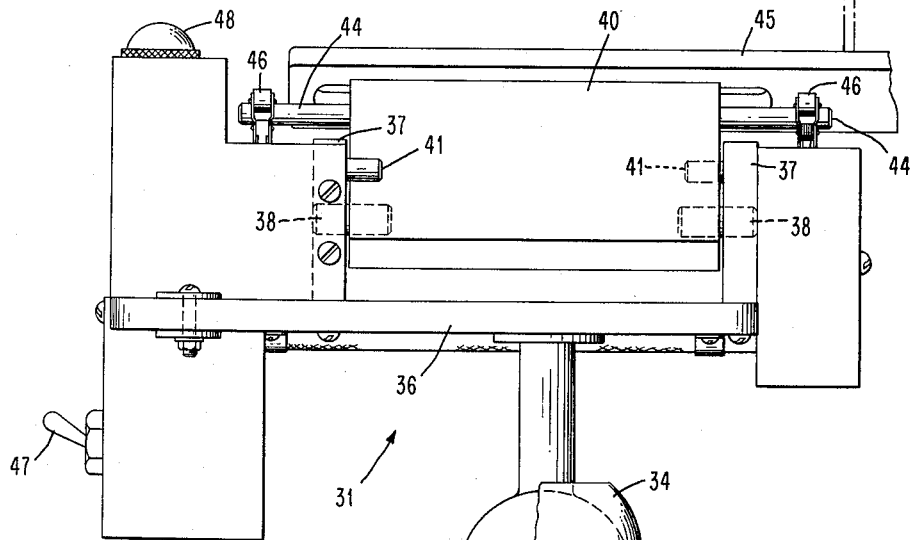
FIG. 4
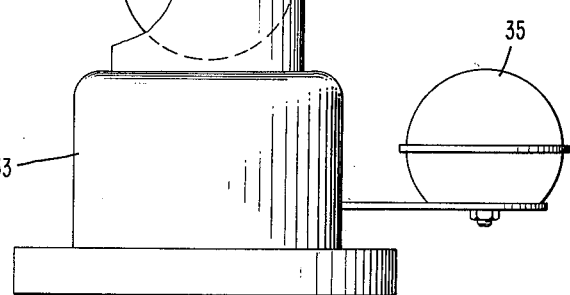

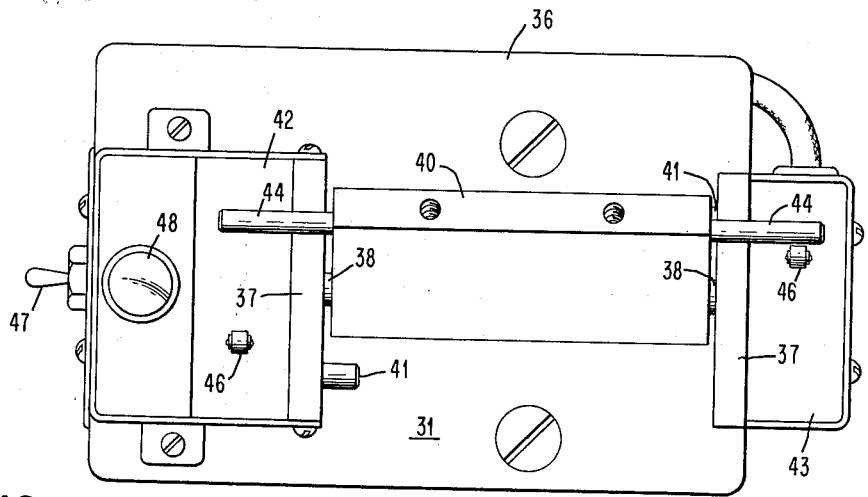

Feb. 23, 1965  R. A. BUTLER ETAL  3,171,114
AUTOMATIC PROGRAMMER
Filed Jan. 3, 1961  6 Sheets-Sheet 5

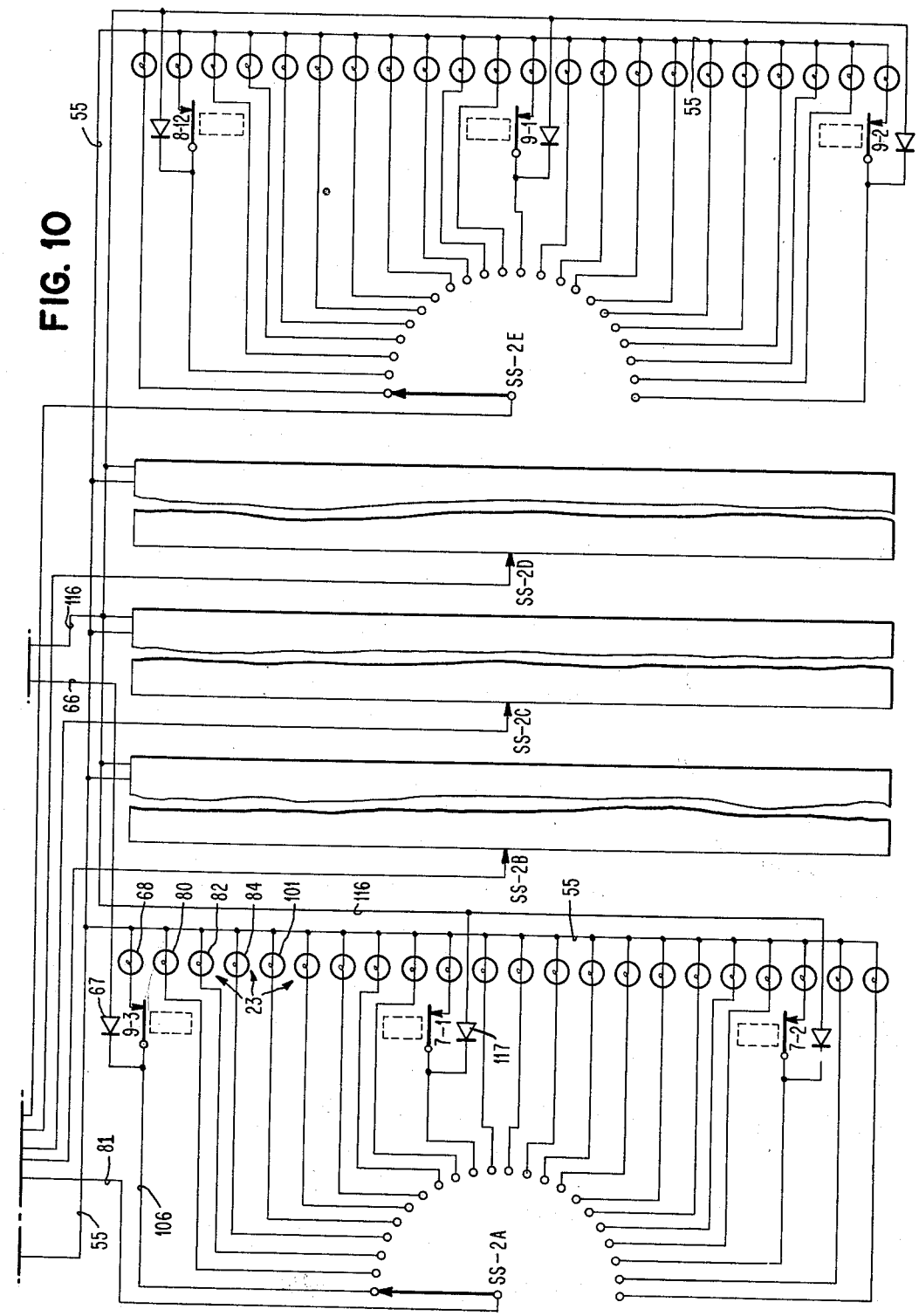

United States Patent Office

3,171,114
Patented Feb. 23, 1965

3,171,114
AUTOMATIC PROGRAMMER
Richard A. Butler, Hopewell Junction, and Robert H. Cadwallader, Joseph J. Isole, Jr., and Gerr Park, all of Poughkeepsie, N.Y., assignors to International Business Machines Corporation, New York, N.Y., a corporation of New York
Filed Jan. 3, 1961, Ser. No. 80,319
2 Claims. (Cl. 340—267)

This invention relates to indicators and more particularly to a visual aid for use on an assembly line.

Many assembly lines are automated, however many, due to size or complexity, cannot be automated. In this portion of the field of assembly visual aids play an important part in assisting the assembler. The visual aids now known take the form of animated diagrams, exploded views and progressive charts, all of which are slow and often confusing.

It is the principle object of this invention to provide a program display or indicator board that will clearly and progressively instruct an assembler in the steps necessary in assembling a device.

Another object is to provide an indicator board which is operated serially, by the completion of each step in an assembly, to indicate to the assembler the next step to be taken.

A further object is to provide an indicator board on which each step of an assembly is shown in illuminated instructions as the preceding step is completed.

A still further object is to provide an illuminated counter which indicates the number of steps taken in one phase of an assembly before another phase is started.

Still another object is to provide a counter controlled by the number of operations completed and by which a check can be made as to the accuracy of the assembly.

Another object is to provide a visual aid that is simple, economical and which will accurately guide an assembler through many intricate steps of an assembly, checking the work progressively.

The foregoing and other objects, features and advantages of the invention will be apparent from the following more particular description of a preferred embodiment of the invention, as illustrated in the accompanying drawings.

In the drawings:

FIG. 1 is a perspective view of the indicator board of the invention together with the work holder or assembly fixture by which the board is controlled.

FIG. 3 is an enlarged perspective view of the upper right hand corner of FIG. 1.

FIG. 4 is a front elevation of the work holder and controlling member of the invention.

FIG. 5 is a plan view of FIG. 4.

FIG. 6 shows a corner of the indicator board with the instructions for wiring a core logic.

FIG. 7 shows a similar corner with instructions for assembling a printing device.

FIG. 8 is a detail of a portion of a magnetic core logic circuit assembled by the invention.

Figure 9:
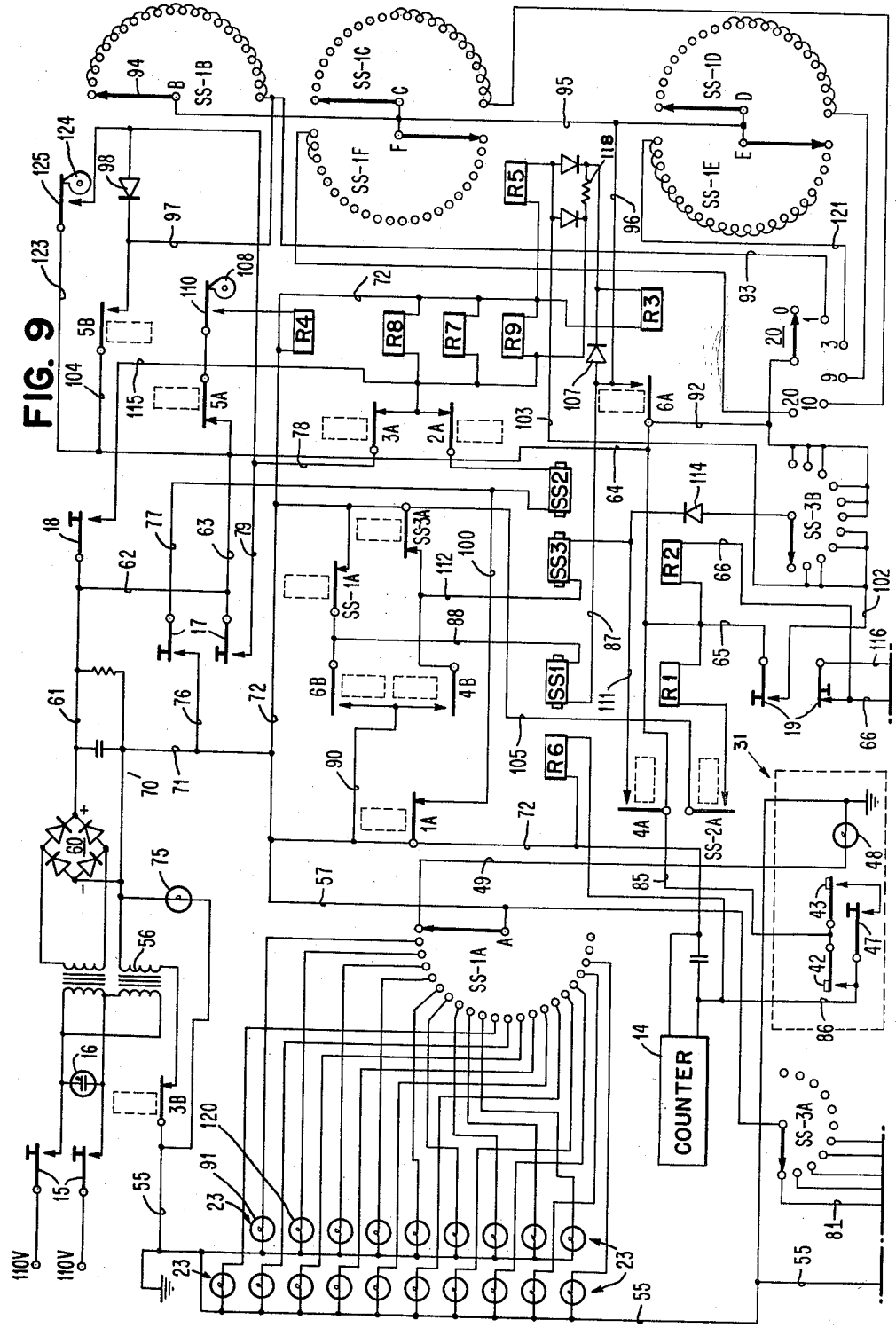

FIGS. 9 and 10, when combined in edge to edge relation, form a schematic diagram of the operating circuit.

The device of the invention, which may be likened to an annunciator board or a pinball machine, comprises an instruction board that is divided into a plurality of boxes each of which contains a lamp. Stretched over the face of the board and having a printed instruction aligned with each box is a program sheet. Each assembly has its own sheet or set of sheets printed with instructions. The part to be assembled is held in a fixture containing switches that are operated as the steps of the assembly progress. In the specific instance disclosed the fixture is adapted to write a core circuit in which a prescribed number of turns of wire must be wound on a specific core before going on to the next. As each turn of winding is made the fixture is rocked causing the board to count and indicate the number of turns made until the prescribed number has been assembled. At this time the next instruction is illuminated to show the next step of the assembly. Periodically the count of turns is indicated in the instructions and this number should correspond to a counter on the board registering the actual number of turns made to that point.

In principle the device is a non-volatile storage device in that current may be cut off at any stage without in any way altering the instruction standing on the board.

Referring to FIG. 1 it will be seen that the instruction board is in the form of a rectangular case 10 mounted to swivel in a base 11. Covering a portion of the face of the case is a panel 12 that carries a counter 14; a main switch 15; a lamp 16, indicating that the power is on; a STEP ONE button 17; a STEP TEN button 18; a RESET button 19 and A TURN COUNT switch 20.

Figure 2:
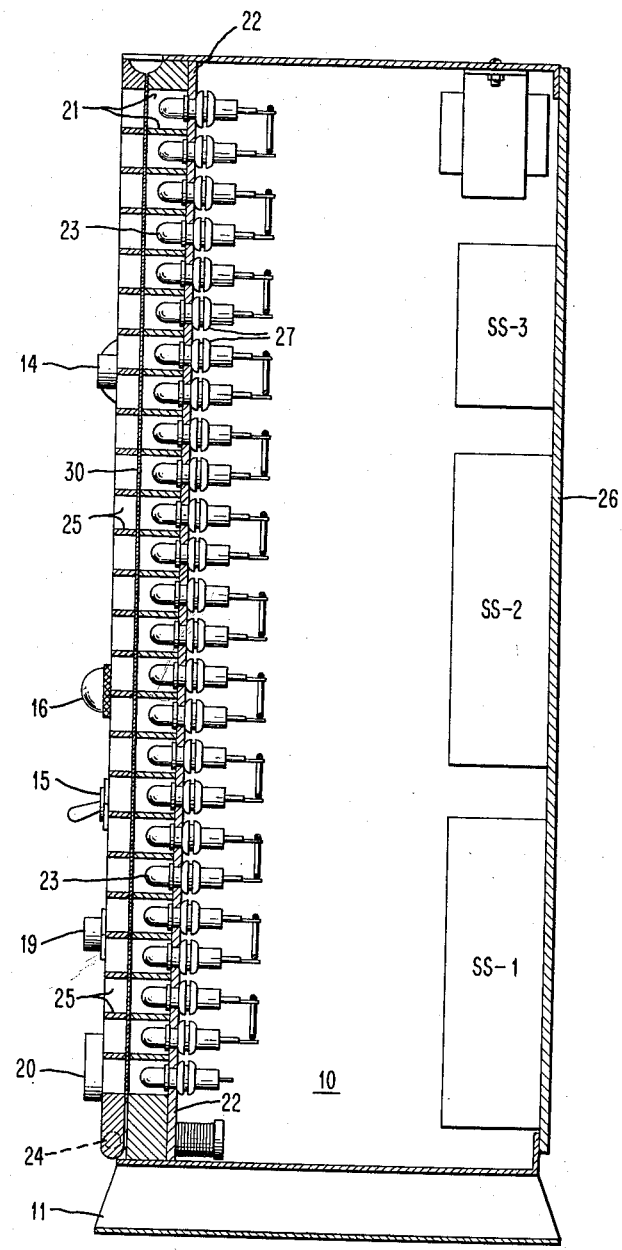
FIG. 2 is a cross section taken along line 2—2 of FIG. 1 showing the arrangements of the parts of the device.

The remainder of the face of the box is fitted with a lattice 21, FIGS. 2 and 3 forming compartments. The lattice 21 formed of cross bars in a frame as shown is secured in a depressed position in the box 10. The lattice is provided with a backboard 22 in which is mounted a lamp 23 for each of the compartments. Hinged to the bottom of the case 10 by hinges 24 is a matching lattice 25 slightly shallower than the first. The compartments of the lattice 25 form frames for individual numbers and instructions printed on a program sheet 30, clamped between the lattices, see FIGS. 6 and 7. By opening the lattice 25 the program sheet 30 can be positioned over the lamps in lattice 21. Closing the lattice 25 holds the sheet in place as seen in FIG. 2. All of the rotary switches, relays and circuits for operating the programmer are secured to a removable backboard 26. The switches SS–1, SS–2 and SS–3 are of the well known rotary type similar to those used in automatic telephony. Switches of this type are arcuate in shape having one or more banks or levels of contacts swept by a brush at each level. The brushes are carried on a central shaft on which is secured a ratchet wheel. Carried on the switch frame is an electro magnet the armature of which carries a pawl acting with the above ratchet wheel. When the magnet attracts the armature the pawl drops behind an adjacent ratchet tooth and steps the brushes one step when the magnet is released. The switches SS–1 and SS–2 have six levels of 22 contacts each while switch SS–3 has two levels of 11 contacts. The relays are of the telephone type having a plurality of make and break contacts. The lamps 23 are baseless and are held in place in the baseboard 22 by rubber grommets 27 as shown in FIG. 2.

Connected to the instruction board by a cable 28 is a fixture 31 for holding the device 32 that is to be assembled. The fixture (FIGS. 4 and 5) is mounted on a base 33 by a ball and socket joint 34 so that it may be clamped at any desired position by a handle 35. Secured to the upright of the ball and socket joint is a base plate 36 having two upright members 37 secured thereon. The members 37 provide trunnions for pivots 38 secured in a rocker plate 40. Each member has a pin 41 therein which acts as a stop for the rocker plate when rocked to one side or the other of center. Secured to the members 37 are microswitches 42 and 43 that are adapted to be engaged by pins 44 extending out from the upper portion of the rocker plate. Secured to the rocker plate is a jig 45 (removed in FIG. 5) for holding the work being assembled. During assembly, each time the jig is rocked one of the pins 44 will actuate a microswitch, the lever of which is provided with an overthrow roller 46.

A switch 47 mounted on the fixture 31 is used for controlling the programmer in indicating one half turn windings or full turn windings. A half turn winding is one in which the wire is passed throgh the core and then on to another core or terminal. A full turn is one in which a wire is passed through a core, around it and through once more. A lamp 48 is provided as an indicator to an assembler that a prescribed number of repeat operations is finished and a change in instruction on the board has taken place. This lamp is an aid to deaf persons in particular as they are unable to hear the switching noises heard by those with normal hearing. One or the other of the microswitches or both are actuated as each asssembly operation is completed depending upon whether the windings are half turn or full term. A corner of a core plane logic circuit such as might be assembled is shown in FIG. 8, however, it is only one of many devices both electrical and mechanical that may be assembled using the program indicator.

In actual operation the assembler after securing a plane 32 in the fixture 31 operates the switch 15. The fixture is always positioned at the start so that the plane extends toward the assembler as shown in FIG. 1. This will cause the lamps behind NO. OF TURNS (FIG. 6) and SEL. SW. ON STEP to light. This informs the assembler that this operation calls for half turn windings and TURN COUNT switch 47 should be turned on. This makes both microswitches in the fixture 32 effective. In accordance with the STEP portion of this instruction, the STEP ONE button 17 is depressed causing the lamp under SET DIAL-1 STEP to be lighted and the lamp under SEL. SW. ON STEP to be extinguished. In accordance with this instruction the pointer of TURN COUNT switch 20 is set at 1 and the STEP ONE button 17 again depressed. This causes the lamp under STEP DIAL-1 STEP to be extinguished and that under TERM 5 STEP to be lit, thus instructing the assembler that the wire 58 be wound on terminal "5" and the STEP ONE button 17 again be depressed causing the lamp under TERM 5 STEP to be extinguished and that under "11" to be lit. This instructs the assembler that the "11" core 52 (FIG. 8) is the core that is to be wound. The wire after being wound on terminal 5 is passed through core 11 and since this is to be a half turn microswitch 42 will be operated and the lamp under NO. OF TURNS is extinguished and that under "1" is lit indicating that one turn has been made.

Simultaneously an electro mechanical counter 14 will be operated to count the turn just made. The number "1" lamp will be lit only momentarily since the COUNT SELECTOR switch has been set at "one." A circuit through this switch will cause the illumination of the next instruction which is "12" indicating that a half turn is to be placed on core "12." Also the NO. OF TURNS square in the top row will be again illuminated. After the wire is passed through core "12" and the fixture rocked, the next instruction will be given. The assembler will continue to wire cores with a half turn until instruction such as TERM 31 STEP is reached. Here the assembler winds the wire off on terminal "31" (not shown) and operates the STEP ONE button 17 which causes the lamp under the COUNT TEN STEP to light. The assembler now checks this numeral "ten" with the number standing on the counter 14. They should agree. If not, an error in the number of turns wound on one of the preceding coils has occurred and the assembler must return to the start and locate the error. This is done by depressing the RESET button 19 which will again illuminate the NO. OF TURNS and SEL. SW. ON STEP instructions. The assembler will now take a step by operating the STEP ONE button which will then illuminate the SET DIAL-1 square and by again operating the STEP ONE button will illuminate the TERM 5 STEP square. The assembler now operates the STEP TEN button 18 which advances the programmer in increments of ten until a point is reached within ten or less steps from the suspected error position. In this particular instance since the count is ten, the assembler would use the STEP ONE button. However, if the count has been, for instance 30, the STEP TEN button 18, would be depressed twice and then STEP ONE button would be used to step the programmer to where the error was suspected to be between the last count of 20 and the new count of 30. When the error is found and corrected, the counter is set to agree with the correct count and the assembly resumed. It is assumed that the lamp is again lighted under COUNT TEN STEP and the assembler will next depress the STEP ONE button stepping to the square illuminating SEL. SW. OFF STEP which indicates to the assembler that the count selector switch 47 should be operated to the off position. The assembler now operates the STEP ONE button causing the SET DIAL-3 STEP to be illuminated which instruction calls for the TURN COUNT switch 20 to be set at 3 to insure that three turns of wire will be counted. The STEP ONE button is now depressed illuminating the square containing TERM 2 STEP. A new wire 58a is wound on terminal 2 and the STEP ONE button again depressed causing the next instruction to appear which will be assumed to be "12," indicating that the three turns of wire are to be placed on core "12." With the selector switch 47 set in the off position, only one of the microswitches, i.e., 42, is operated so that every other time the fixture 31 is rocked the lamps in the NO. OF TURNS or upper two rows are sequentially operated. This continues until three turns have been placed on core "12" where the lamp under the square in the first row containing the numeral "3" is illuminated momentarily. A circuit to be described below through the TURN COUNT switch will again illuminate the NO. OF TURNS square in the first row and stepping to the next square, containing an instruction to indicate which core is to be wound next. This continues until a change of wire is called for.

In FIG. 7 is shown a corner of the program board in which the instructions for a mechanical assembly such as a printing mechanism are given. Here the upper two rows count the number of parts and the instructions which of necessity are more detailed, take up two of the present boxes on the board described above. This merely necessitates the extinguishing or removal of every other lamp in the lamp assembly.

As mentioned above, the invention is used to wire core plane logic circuits, one corner of such a circuit being shown in FIG. 8. Openings 53 are formed as shown to permit the wires to be wound around a core 52 while in position. Terminals 54 are provided around the edge of the plastic frame 50 to which the wires used in winding the coils may be attached. It is noted that the terminals and cores are numbered by stampings in the plastic for the convenience of the assembler. An adhesive is used to hold the cores in the frame while being wound. The operator fastens this frame in the fixture 31 as shown in FIG. 1.

In starting to assemble a core plane the operator operates the main switch 15 (see FIGS. 9 and 10) which closes the main circuit through a transformer and through a rectifier 60 and lights the lamp 16 on the panel of the program board indicating that the programmer is ready to operate. It may be well at this point to call attention to the fact that the lamps 16, 23, 48 and 75 are in an A.C. circuit and the relays and switches are in a D.C. circuit. The A.C. circuit is powered by a secondary winding 56 of the step down transformer and the D.C. is derived from the rectifier 60. One leg of the transformer is connected through a relay contact 3B to a lead 55 common to all the lamps in FIGS. 9 and 10. The other leg is connected to the brushes of the A level of switches SS–1 and SS–3 by lead 57. Simultaneously, a circuit is closed from the positive side of rectifier 60 over leads 61, 62, 63, 64 and 65 through the winding of relay R–2 over lead 66 through diode 67 through the normally closed contact 9–3 of the relay R–9 (FIG. 10) and lights lamp 68. The lamp is located under the first of the program instructions on the program board, which in the portion of the program shown in FIG. 6 would be SEL. SW. ON STEP. At the same time a circuit is closed, as described above, from transformer winding 56 through the brush A of the SS–1 switch thus lighting one of the lamps 23 specifically lamp 75 which is under the first notation in the top row of FIG. 6, i.e., NO. OF TURNS. A circuit is also closed through the first contact of level A switch SS–1 over lead 49 to ground, lighting lamp 48 on the fixture 31.

The operator now follows the first instruction which is STEP. This is done by depressing STEP ONE button 17 which closes a circuit from negative rectifier over leads 70, 71 and 76 through the upper contact of key 17 over lead 77 through the winding of magnet SS–2 contacts 2A and 3A, over leads 78 and 79, through the lower contact of switch 17 and thence over leads 62 and 61 to positive rectifier 60. This will cause the operation of magnet SS–2 causing the switch SS–2 to step the brush in level SS–2A one step to the second contact when the STEP ONE button is released.

This will close the A.C. circuit traced above to light lamp 80 which is under the notation SET DIAL–1 STEP. In accord with this instruction the assembler will set the TURN COUNT switch 20 on terminal 1. The operator now follows the instruction to step and again operates the STEP ONE button 17 closing the same circuit and causing the brush of the A bank of the SS–2 switch to step to the third terminal thereby closing a circuit over to light lamp 82 which will illuminate the instruction TERM 5 STEP. In accordance with this instruction the operator will wind the beginning of the wire around terminal 5 and again operate button 17 to cause the brush of the A bank of the SS–2 switch to move to the fourth terminal which will close a circuit to light the lamp 84. This will light up the instruction "11" indicating to the operator that the "11" coil is to be wound with a half turn.

The assembler now passes the wire through the "11" coil and rocks the fixture 31 closing microswitch 42 to close a circuit over positive leads 64 and 85, through the microswitch, lead 86, winding of relay R–6 over negative leads 72 and 71 to rectifier 60. Relay R–6 in operating completes a circuit for the SS–1 magnet from positive lead 64 through contact 6A now closed, lead 87, winding of the magnet, lead 88, contact 6B now closed, lead 90, to negative lead 72. The magnet SS–1 steps the brush in level A to the second contact lighting lamp 91 under the "1" square in the turn counting row. This lamp is illuminated momentarily since a circuit is closed simultaneously from positive lead 64 over lead 92 through the contact arm of TURN COUNTER switch 20, which as mentioned above, had been set on "1," over lead 93 through the twenty-one bridged contacts of level B of switch SS–1, brush 94 of that level, leads 95, 96 and 87 through the winding of magnet SS–1, lead 88, contact SS–1A to negative lead 72. The bridging of the contacts on level B and contact SS–1A causes the switch SS–1 to return to normal again lighting NO. OF TURNS lamp 75. As the brush 94 of level B of the switch SS–1 passes over the twenty second position a circuit is closed for operating magnet SS–2 from positive current on lead 95 through brush 94 lead 97 diode 98 leads 79 and 78, contacts 3A and 2A through the winding of magnet SS–2 lead 100 contact 1A to negative lead 72. Magnet SS–2 will step switch SS–2 one step to the fifth contact lighting lamp 101 illuminating the instruction "12."

As the operator continues to wind cores and rock the fixture 31 the above circuits and operations are repeated until the instruction TERM 31 STEP is reached. The wire is wound off on the terminal "31" and the switch SS–2 stepped to the instruction COUNT 10 STEP. As described above the assembler now checks and if an error is found the RESET button 19 is depressed closing a circuit for resetting switches SS–1, SS–2 and SS–3 to their home or normal positions. This circuit is traced from positive lead 65, upper contact of button 19, leads 102 and 103, winding of relay R–5 to negative lead 72 operating relay R–5.

Relay R–5 controls the return of switch SS–1 to home position as follows: positive lead 63 lead 104 contact 5B lead 97, bridging of the contacts of level B of switch SS–1 and its brush, leads 95, 96 and 87 winding of magnet SS–1 lead 88 contact SS–1A to negative lead 72. Contact SS–1A acts as an interrupter contact and causes the switch to step to normal.

Upon reaching normal, switch SS–1 through contact 125 closed by a cam 124 on the shaft of that switch closes a circuit from positive lead 64, lead 123, contact 125 leads 79 and 78 contacts 3A and 2A winding of magnet SS–2 lead 100 contact 1A to negative over lead 72. The operation of magnet SS–2 not only steps the switch but closes contact SS–2A. This completes a circuit for relay R–1 from positive lead 64, lead 65, winding of relay R–1 contact SS–2A lead 105 to negative lead 72. The operation of relay R–1 opens contact 1A opening the circuit for magnet SS–2 causing it to step the switch and open contact SS–2A permitting relay R–1 to again operate completing the circuit for magnet SS–2. This series of operations continues until the home position of the switch is reached at which time relay R–2 is operated over a circuit from positive lead 65, winding of relay R–2, lead 66, diode 67, lead 106, home contact and brush of level A of switch SS–2, lead 81 first contact of level A of switch SS–3 which has been returned to normal as will be described below and over lead 57 to negative lead 72. Relay R–2 operating opens the circuit for the SS–2 magnet at contact 2A thus stopping the switch.

Simultaneously a circuit is closed from positive lead 63, lead 64, lead 104, contact 5B lead 97 bridging of level B of switch SS–1 brush 94 leads 95 and 96 diode 107 winding relay R–3 to negative lead 72. Relay R–3 in operating will open the circuit for the SS–2 magnet at 3A to insure that the SS–2 switch will not start again until the RESET button is released.

If the switch SS–3 is off its home position when the RESET button is actuated, it is restored to normal over a circuit from positive lead 64 upper contact of button 19, lead 102, bridged contacts one to five and brush of level B of switch SS–3, diode 114, winding magnet SS–3, lead 112, contact SS–3A, to negative lead 72. The switch will continue to step to the sixth contact at which time a circuit will be closed from positive lead 64, lead 92 bridged contacts six to eleven and then to negative over the above circuit. Both circuits will cause the SS–3 magnet to return the switch to normal using contact SS–3A as an interrupter.

With all the switches returned to normal, the lamps under the NO. OF TURNS and SEL. SW. ON STEP instructions will be lit. The assembler now may actuate either the STEP ONE or STEP TEN buttons to reset the programmer to the point at which the error was made. After the error is corrected, the counter 14 is reset and the work proceeds.

The circuit for the STEP ONE button 17 having been described, that for the STEP TEN button 18 is closed as follows: positive lead 61, button 18, lead 115, windings of relays R–3, R–7, R–8 and R–9 in parallel, to negative lead 72. Relay R–3 in operating opens the A.C. lamp circuit at contact 3B thus preventing the lamps from flashing as the switches advance. Contact 3A opens the circuit traced above from the RESET button to the SS–2 magnet preventing possible interferences from an accidental operation of the RESET KEY.

Button 18 also closes a circuit from positive lead 61 over lead 115, contact 2A, magnet SS–2, lead 100, contact 1A to negative lead 72. Relay R–1 will be operated as described above and the switch will step as long as STEP TEN button 18 is held. However, every tenth contact in any level switch SS–2 is wired to actuate relay R–2 over a circuit from positive lead 64 winding of relay R–2 lead 66 normal contact of button 19, lead 116, diode 117, tenth contact and brush of level A of switch SS–2, lead 81, first contact and brush of level A of switch SS–3, lead 57, to negative lead 72, operating relay R–2. This opens contact 2A thus opening the circuit for the magnet SS–2 causing switch SS–2 to step to the eleventh position. Simultaneously, relay R–3 is operated by button 18 through resistance 118. This causes relay R–3 to operate slowly. The operation of the STEP TEN button opens contact 2A which remains open after the button is released. If the button is again depressed contact 3A will remain closed long enough to advance switch SS–2 and allow relay R–2 to release.

Relays R–7, R–8 and R–9 open a circuit to the lamp in each tenth position of the SS–2 switch at the contacts such as 7–1, 8–12 and 9–1 (FIG. 10). This circuit is opened as it would ground the circuit for relay R–2 and cause its misoperation.

When an instruction sheet 30 contains more than 20 instructions or the capacity of a level of switch SS–2, the level selector switch SS–3 at level A is used to change the negative supply from one brush to the next. This change over will take place when the brush of one level of switch SS–2 passes the twentieth position. At this time a cam such as 108 (not shown) on the switch shaft will close contact 110, in turn closing a circuit from positive lead 63, contact 5A, contact 110, winding relay R–4, to negative lead 72, operating relay R–4, which closes a circuit for stepping the SS–3 switch. It is traced from positive lead 64, contact 4A, lead 111, magnet SS–3, lead 112, contact 4B, lead 90, to negative lead 72. When switch SS–2 is next stepped the contact 110 will open releasing relay R–4 in turn stepping switch SS–3.

The error having been located and corrected the STEP ONE button 17 is depressed closing the circuit traced above operating the SS–2 magnet to step the SS–2 switch one step thus lighting the instruction SEL. SW. OFF STEP. In accord with this instruction the switch 47 on the fixture 31 is set to the off position as shown in FIG. 9. This will cut off microswitch 43 and a pulse will only be sent to relay R–6 on every other rocking of the fixture 31 or upon the completion of a complete turn of winding. The STEP ONE button will then be depressed causing SET DIAL–3 STEP to be lighted instructing the assembler to set the TURN COUNT switch 20 to position 3. The STEP ONE switch is again depressed and the next instruction TERM 12 STEP is lit.

The assembler winds one end of the wire about the terminal "12" and depresses the STEP ONE button to light the next instruction "12" (not shown) indicating that core "12" is to be wired.

The assembler is now ready to start wiring and the free end of the wire 58A is then inserted into core "12." The fixture is now rocked so that the other side of the plane is exposed and the wire drawn through. Since three turns have to be made on this core the wire is then passed into the aperture 53 along side of the coil and the fixture again rocked, this time closing microswitch 42 which closes a circuit from positive lead 64 over lead 85 through microswitch 42 over lead 86, winding of the relay R–6 and thence back to the negative lead. Relay R–6 in operating closes a circuit from the negative lead 72 over lead 90 through contact 6B, lead 88 winding of magnet SS–1, lead 87 the now closed contact 6A to the positive lead 64 as heretofore traced thus operating the SS–1 magnet which causes the SS–1 switch to step to the second contact and thus illuminate lamp 91 which will illuminate the numeral "one" in the turns counting row thus indicating that one turn has been made around the core "12." The operator now continues to insert the wire and rock the fixture making the necessary three windings around core "12" and upon the third rocking of the fixture the switch SS–1 will be moved to the third contact thereby lighting lamp 120. On being stepped the third time, the brush in the E bank of the SS–1 switch will move from the third contact to the fourth and thus close a circuit from positive lead 64, lead 92 through the brush of dial 20 which has heretofore, as we said, been set on the terminal marked "3" over lead 121, bridged contacts twenty-two to four and the brush of the E bank of the SS–1 switch, leads 96 and 87, winding of magnet SS–1, lead 82, SS–1A contact, negative lead 72. This will step the SS–1 switch back to normal again lighting lamp 75. Had the switch 20 been set on the 9 contact and there are 9 turns to be placed on the core, the same circuit would be closed from positive through the switch contact 9 through all of the contacts of the bank D of switch SS–1 wired together to the ninth contact and when the brush had been stepped to the ninth contact this circuit would cause the SS–1 magnet to step, opening and closing its SS–1A contact thus opening and closing of the negative side of the circuit and stepping the switch SS–1 back to normal or to the zero position.

Thus, it is seen that in assembling an electrical component such as a core plane each operation is monitored and causes a change in the instructions by indicating a count or a change in procedure.

While the invention has been particularly shown and described with reference to a preferred embodiment thereof, it will be understood by those skilled in the art that various changes in form and details may be made therein without departing from the spirit and scope of the invention.

What is claimed is:

1. In an apparatus for aiding in the assembling of a device, a display board having a plurality of lamps located thereon, an interchangeable translucent sheet superimposed over said lamps, said sheet being laid out in areas complementary to said lamps, and carrying notations as to the number of operations and procedures involved in assembling said device, a jig for holding said device during assembly, contacts closed by the movement of said jig during assembly of said device, a rotary switch actuated by said contacts for sequentially lighting said lamps thereby indicating the number of operations performed; and a second rotary switch having contacts connected to lamps indicating procedure, said second switch being actuated by a circuit from said first switch to step said second switch to light one of said lamps to indicate a change of procedure upon completion of a predetermined number of movements of said jig.

2. In an apparatus for aiding in the assembling of a device, a display board having a plurality of lamps located thereon, a lattice framing each lamp, an interchangeable translucent record sheet superimposed over said lattice and laid out in areas complementary to said lamps, said areas being provided with notations as to the number and nature of the movements involved in assembling said device, a rockable jig for holding said device during assembly, contacts actuated by said jig and closed each time the jig is rocked during assembly, a rotary switch stepped by a circuit closed by said contacts, to control lamps illuminating numeric notations on said sheet, said notations sequentially indicating the number of movements of assembly that have been completed, a resetting circuit for automatically resetting said switch to a normal position, a manual switch preset to prepare said resetting circuit for closure upon said rotary switch having been stepped a number of steps corresponding to the setting of said manual switch, a second rotary switch controlling lamps illuminating instructions on said sheet dealing with procedure of assembling said device; and a circuit closed by said first rotary switch to cause said second rotary switch to step one step to close a circuit to light a lamp to indicate a change of the next procedure after completion of a predetermined number of movements of said jig.

References Cited in the file of this patent

UNITED STATES PATENTS

| | | |
|---|---|---|
| 450,615 | Delany | Apr. 21, 1891 |
| 502,007 | McCormick | July 25, 1893 |
| 1,096,779 | Clement | May 12, 1914 |
| 1,340,145 | Blair | May 18, 1920 |
| 1,728,997 | Johnson | Sept. 24, 1929 |
| 2,336,548 | Kimball | Dec. 14, 1943 |
| 2,346,869 | Poole | Apr. 18, 1944 |
| 2,410,156 | Flory | Oct. 29, 1946 |
| 2,488,324 | Pecard | Nov. 15, 1949 |
| 2,529,535 | Bertelsmeyer | Nov. 14, 1950 |
| 2,781,850 | Noble | May 14, 1957 |
| 2,905,242 | Heffner | Sept. 22, 1959 |
| 2,952,079 | Koch | Sept. 13, 1960 |
| 2,970,763 | Freeman | Feb. 7, 1961 |
| 3,010,235 | Roberts | Nov. 28, 1961 |
| 3,015,094 | Reynolds | Dec. 26, 1961 |